United States Patent [19]
Highsmith

[11] Patent Number: 5,845,794
[45] Date of Patent: Dec. 8, 1998

[54] STORAGE RACK HAVING SNAP-ON BEAMS

[75] Inventor: Charles E. Highsmith, deceased, late of Nashville, Tenn., by Ellen Fuller, executrix

[73] Assignee: Unarco Material Handling, Inc., Springfield, Tenn.

[21] Appl. No.: 844,733

[22] Filed: Apr. 21, 1997

[51] Int. Cl.[6] .................................................. A47F 5/00
[52] U.S. Cl. ........................ 211/189; 211/151; 211/187
[58] Field of Search .................................. 211/189, 190, 211/191, 151, 184, 187, 59.2

[56] References Cited

U.S. PATENT DOCUMENTS

| | | | |
|---|---|---|---|
| 4,239,100 | 12/1980 | Corey | 193/35 R |
| 4,453,641 | 6/1984 | Rasmussen et al. | 211/151 |
| 5,115,920 | 5/1992 | Tipton et al. | 211/151 X |
| 5,259,518 | 11/1993 | Sorenson et al. | 211/151 X |
| 5,279,430 | 1/1994 | Benton | 211/151 |
| 5,295,591 | 3/1994 | Slater | 211/151 X |
| 5,360,122 | 11/1994 | Benton | 211/151 |
| 5,450,968 | 9/1995 | Buetos | 211/187 X |

*Primary Examiner*—Robert W. Gibson, Jr.
*Attorney, Agent, or Firm*—Rockey, Milnanow & Katz, Ltd.

[57] ABSTRACT

In a storage rack comprising two front columns, two back columns, and, at each tier, two side beams, a front beam, and a back beam, a front portion of each side beam projects frontwardly and a back portion thereof projects backwardly. The front portion has a fin projecting upwardly, a notch opening frontwardly below a front part of the fin, and a tab projecting backwardly from the fin. The front beam has a front wall, a back wall, and a lower lip projecting from a lower part of the front wall. Each slot receives the tab of a respective one of the side beams and the lower lip projects backwardly into the front notches of the side beams so as to secure the front beam to the side beams. The back beam is secured similarly to the back portions of the side beams.

7 Claims, 3 Drawing Sheets

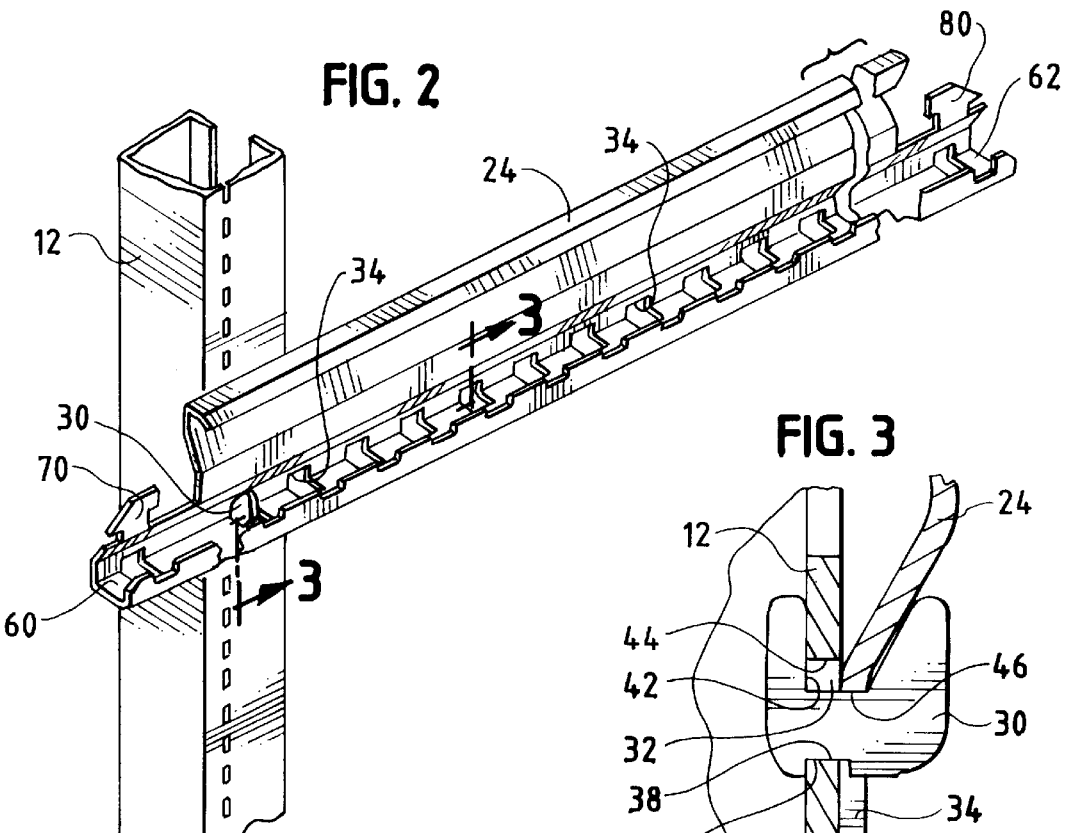

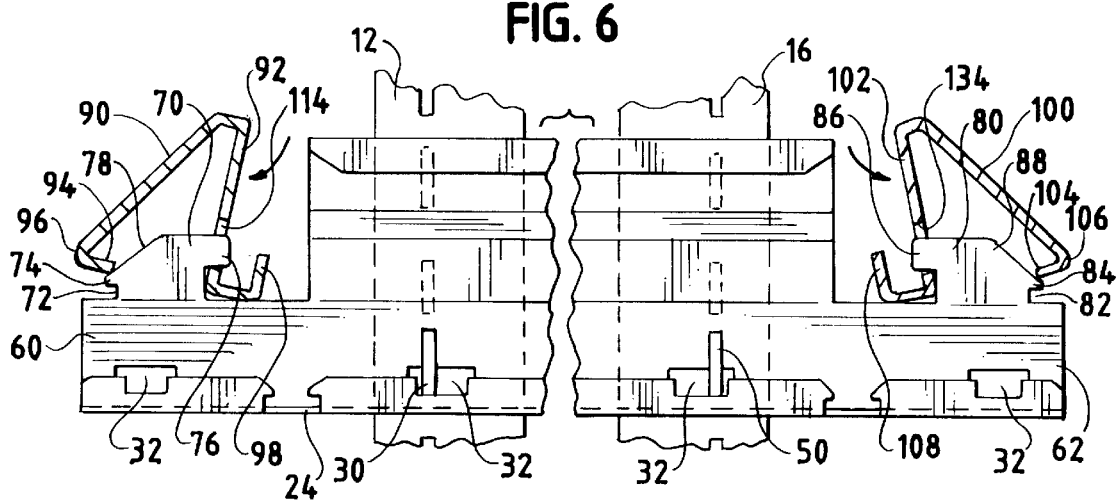
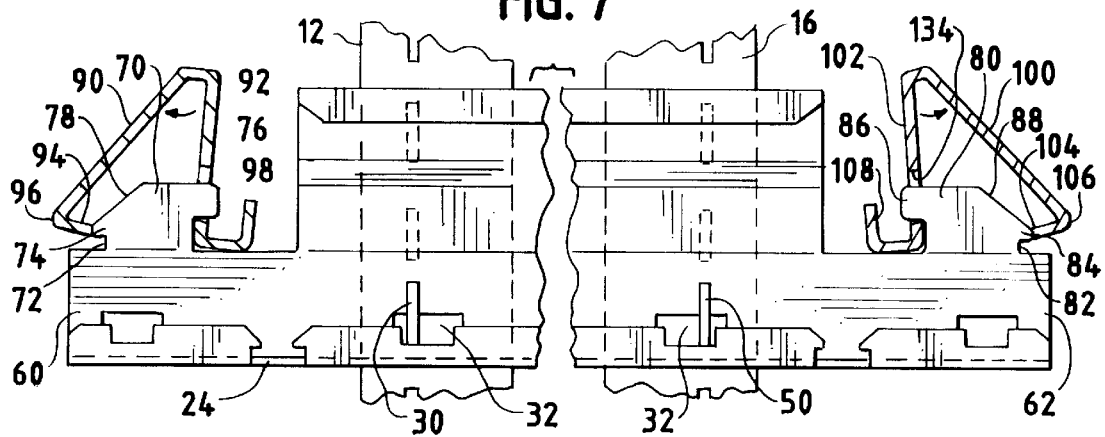
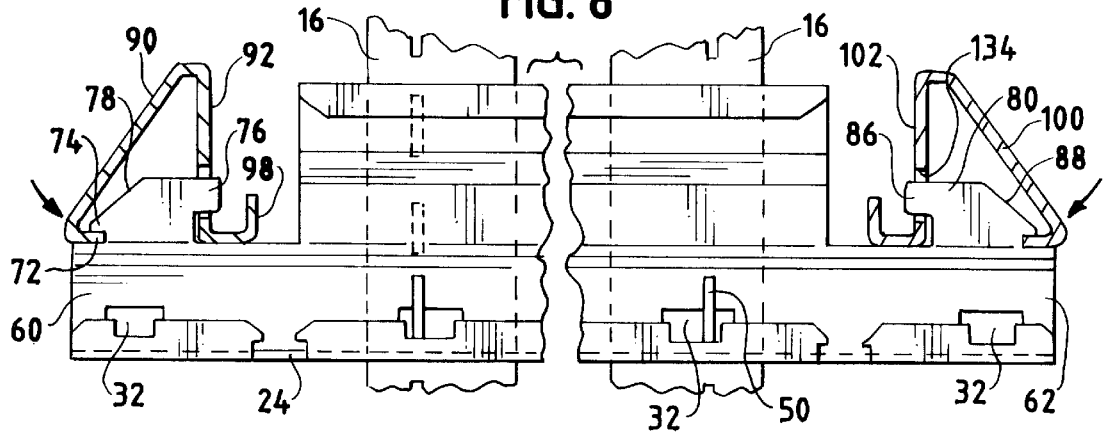

STORAGE RACK HAVING SNAP-ON BEAMS

TECHNICAL FIELD OF THE INVENTION

This invention pertains to a storage rack comprising two front columns, two back columns, and a front beam, which is adapted to be snapped onto endwise projecting portions of the side beams.

BACKGROUND OF THE INVENTION

A storage rack of a type in widespread use in warehouses, in storerooms, and elsewhere may have one bay or multiple bays. Each bay has multiple tiers and is defined by two front columns and two back columns. Each tier of each bay is defined by two side beams, a front beam, and a back beam.

Each side beam connects an associated one of the front columns and an associated one of the back columns. Each side beam has a front portion projecting frontwardly beyond the associated one of the front columns. The front beam connects the front portions of the side beams. Each side beam has a back portion projecting frontwardly beyond the associated one of the back columns. The back beam connects the back portions of the side beams.

Commonly, a storage rack of the type noted above is equipped with roller tracks and may be also equipped with lane dividers, so as to serve as a package flow or carton flow system. An example of a storage rack of the type noted above is disclosed in U.S. Pat. No. 4,239,100, which discloses a package flow system. Another example thereof is disclosed in U.S. Pat. No. 5,279,430. Another example thereof is disclosed in U.S. Pat. No. 5,360,122.

SUMMARY OF THE INVENTION

This invention improves a storage rack having multiple tiers, comprising two front columns and two back columns, and comprising, at each tier, two side beams and a front beam. Usually, at each tier, the storage rack also comprises a back beam, as discussed below. Each side beam connects an associated one of the front columns and an associated one of the back columns. Each side beam has a front portion projecting frontwardly beyond the associated one of the front columns. The front beam connects the front portions of the side beams.

As provided by this invention, the front portion of each side beam has a fin projecting upwardly from the front portion of said side beam, a front notch opening frontwardly below a front part of the fin, and a tab projecting backwardly from a back part of the fin. Moreover, the front beam has a front wall, a back wall unitary with the front wall, and a lower lip unitary with the front wall. The lower lip projects backwardly from a lower part of the front wall. Furthermore, the back wall has two slots.

As contemplated by this invention, so as to secure the front beam to the side beams, each slot receives the tab projecting backwardly from the fin of the front portion of a respective one of the side beams and the lower lip projects backwardly into the front notches of the front portions of the side beams.

Preferably, the front beam has two opposite ends, between which the lower lip extends continuously. Preferably, the front part of the fin of each side beam has a front edge sloping upwardly and backwardly above the front notch, and the front wall of the front beam slopes upwardly and backwardly from the lower lip. Preferably, the front beam has sufficient resiliency to enable the lower lip of the front beam to be manually snapped over the front parts of the fins, into the front notches, after the tabs have been received by the slots.

Optionally, at each of the opposite ends, the front beam has an outer slot and an inner slot. The tabs are received alternatively by the inner slots or by the outer slots.

In a preferred embodiment, the storage rack also comprises a back beam, which is similar to the front beam. Moreover, each side beam has a back portion projecting backwardly beyond the associated one of the back columns, and the back beam connects the back portions of the side beams.

In the preferred embodiment, the back portion of each side beam has a fin projecting upwardly from the back portion of said side beam, a back notch opening backwardly and extending frontwardly below a back part of the fin of the back portion, and a tab projecting backwardly from a front part of the fin of the back portion. Moreover, the back beam has a back wall, a front wall unitary with the back wall of the back beam, and a lower lip unitary with the back wall of the back beam. The lower lip of the back beam projects from a lower part of the back wall of the back beam. Furthermore, the back wall of the back beam has two slots.

In the preferred embodiment, so as to secure the back beam to the back portions of the side beams, each slot of the back wall of the back beam receives the tab projecting frontwardly from the inner part of the fin of the back portion of a respective one of the side beams and the lower lip of the back beam projects frontwardly into the back notches of the back portions of the side beams so as to secure the back beam to the side beams.

These and other objects, features, and advantages of this invention are evident from the following description of a preferred embodiment of this invention, with reference to the accompanying drawings.

BRIEF DESCRIPTION OF THE DRAWINGS

FIG. 2 is a fragmentary, perspective detail of a column of the storage rack and a side beam of the storage rack.

FIG. 3, on a larger scale, is a fragmentary, sectional view taken along line 3—3 of FIG. 2, in a direction indicated by arrows.

FIG. 4 is a fragmentary, perspective detail of a front beam of the storage rack and a side beam of the storage rack, as shown with the front beam having an inner slot and an outer slot and with the inner slot receiving a tab on the side beam.

FIG. 5 is a fragmentary, perspective detail of the front beam of FIG. 4, the side beam of FIG. 4, a front beam of an adjacent rack similar to the storage rack, and a side beam of the adjacent rack, as shown with each front beam having an inner slot and an outer slot and with the outer slot receiving a tab on the side beam associated with such front beam.

FIGS. 6, 7, and 8 are fragmentary details showing successive stages in mounting of the front and back beams to one of the side beams.

DETAILED DESCRIPTION OF THE PREFERRED EMBODIMENT

Figure 1:
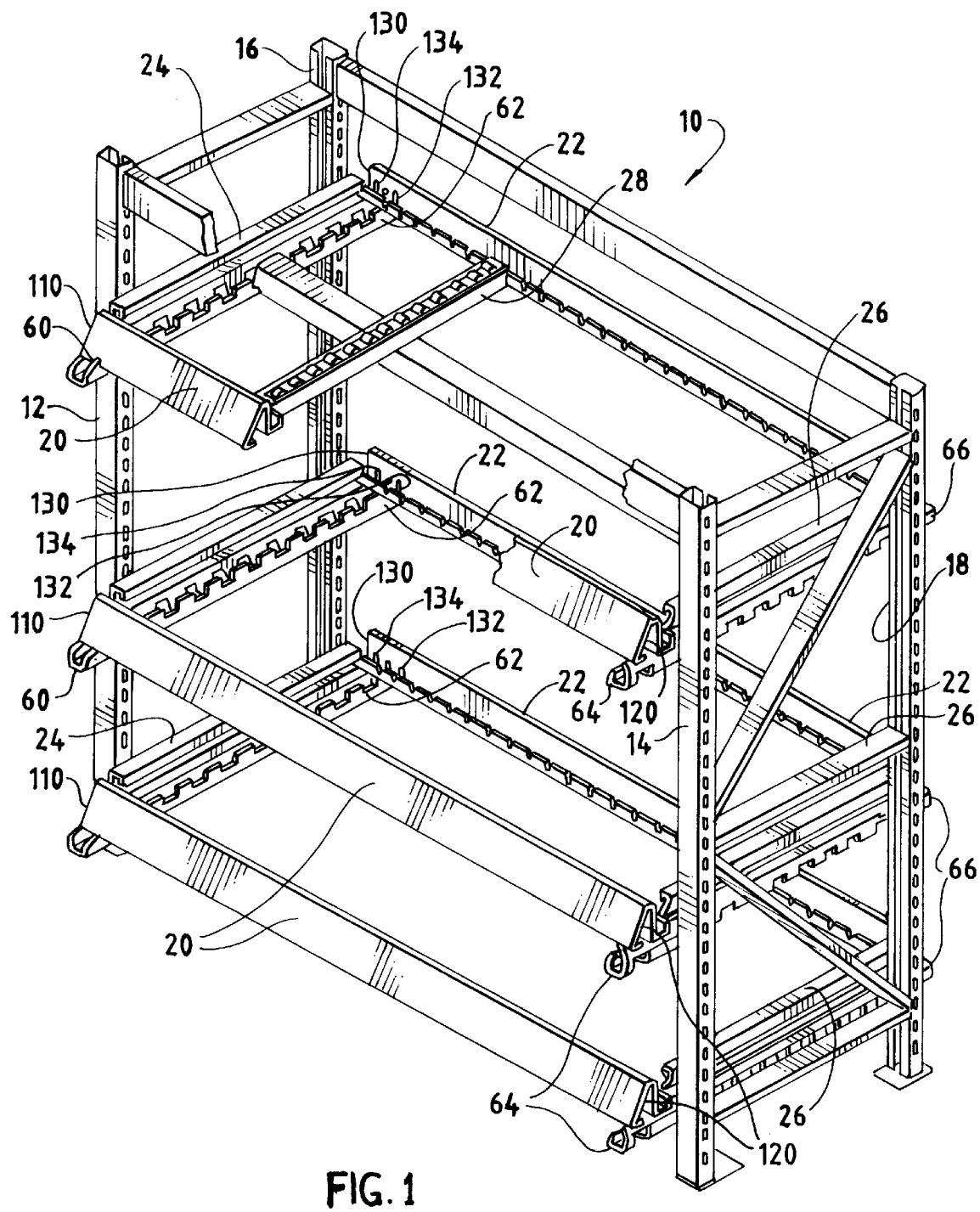
FIG. 1 is a partly broken away, perspective view of a storage rack constituting a preferred embodiment of this invention.

As shown in FIG. 1, a storage rack 10 of the type noted above constitutes a preferred embodiment of this invention. The storage rack 10 is made primarily from roll-formed, carbon steel components, which can be conveniently shipped in a knocked-down condition and which can be readily assembled on site. As shown in FIG. 1, the storage rack 10 has one bay, which has three tiers. This invention is not limited, however, to one bay or to three tiers.

Broadly, the storage rack 10 comprises four similar columns, namely a front column 12 at the left side of the storage rack 10, a front column 14 at the right side thereof, a back column 16 at the left side thereof, and a back column 18 at the right side thereof, along with various braces, which brace the front and back columns at the upper front, upper back, and each side of the storage rack 10. The front and back columns and the braces are assembled to one another by known means outside the scope of this invention.

At each tier, the storage rack 10 comprises two cross beams similar to each other, namely a front beam 20 and a back beam 22, and two side beams similar to each other, namely a side beam 24 extending between and connecting the front and back beams 20, 22, at the left side of the storage rack 10 and a side beam 26 extending between and connecting the front and back beams 20, 22, at the right side of the storage rack 10.

At each tier, the storage rack 10 comprises roller tracks 28 (one shown) extending between and connected to the front and back beams 20, 22, and also may comprise lane dividers (not shown) extending between and connected to the front and back beams 20, 22. The roller tracks may conform to any of the roller tracks disclosed in U.S. Patents Re. 34,924, No. 5,435,427, and No. 5,476,167, the disclosures of which are incorporated herein by reference. The lane dividers may conform to the lane divider disclosed and described as a longitudinal divider in U.S. Pat. No. 5,360,122, supra, the disclosure of which is incorporated herein by reference.

In the following paragraphs, the front, back, and side beams 20, 22, 24, 26, at an exemplary tier are described. The front, back, and side beams 20, 22, 24, 26, at each of the other tiers are similar and are mounted similarly. As described in the following paragraphs, the front, back, and side beams 20, 22, 24, 26, embody certain novel features. In all other respects, the storage rack 10 is similar to storage racks known heretofore and exemplified by storage racks available commercially from Unarco Material Handling, Inc. of Springfield, Tenn.

As shown in FIG. 3 and other views, the side beam 24 is mounted to the front column 12 by a steel clip 30 of a known type used in storage racks. The clip 30 passes through a selected one of a series of apertures 32 spaced vertically from one another along the front column 12 and through a selected one of a series of apertures 34 spaced horizontally from one another along the side beam 24. The clip 30 has a lower notch 36 receiving a lower margin 38 of the selected aperture 34 and an upper notch 42 receiving both an upper margin 44 of the selected aperture 32 and an upper margin 46 of the selected aperture 34. Thus, the side beam 24 bears downwardly against the clip 30, which bears downwardly against the front column 12. A similar clip 50 is used to mount the side beam 24 similarly to the back beam 16. Similar clips are used to mount the side beam 26 to the front column 14 and to the back column 18.

The front beam 20 and the back beam 22 are similar to each other, as made, but are mirror images of each other, as installed. The side beam 24 and the side beam 26 are similar to each other, as made, but are mirror images of each other, as installed.

The side beam 24 has a front portion 60, which when the side beam 24 is mounted to the front column 12 and to the back column 16 projects frontwardly beyond the front column 12, and a back portion 62, which when the side beam 24 is mounted thereto projects backwardly beyond the back column 16. The front portion 60 of the side beam 24 is a mirror image of the back portion 62 of the side beam 24. The side beam 26 has a front portion 64, which when the side beam 26 is mounted to the front column 14 and to the back column 18 projects frontwardly beyond the front column 14 at the left side, and a back portion 66, which when the side beam 26 is mounted thereto projects backwardly beyond the back column 18. The front portion 64 of the side beam 26 is a mirror image of the back portion 66 of the side beam 26.

As shown in FIGS. 6, 7, and 8, the front portion 60 of the side beam 24 has a fin 70 projecting upwardly, a front notch 72 opening frontwardly below a front part 74 of the fin 70, and a tab 76 projecting backwardly from the fin 70. The front part 74 of the fin 70 has a front edge 78 sloping upwardly and backwardly from the front notch 72. Similarly, the back portion 62 of the side beam 24 has a fin 80 projecting upwardly, a back notch 82 opening backwardly below a back part 84 of the fin 80, and a tab 86 projecting frontwardly from the fin 80. The front part 84 of the fin 80 has a front edge 88 sloping upwardly and frontwardly from the back notch 82.

As shown in FIGS. 6, 7, and 8, the front beam 20 has a front wall 90, a back wall 92 unitary with the front wall 90, a lower lip 94 projecting backwardly from a lower part 96 of the front wall 90 and extending continuously between the opposite ends of the front beam 20, and an upturned flange 98 integral with the back wall 92. The front wall 90 slopes upwardly and backwardly from the lower lip 94. Similarly, the back beam 22 has a back wall 100, a front wall 102 unitary with the back wall 100, a lower lip 104 projecting backwardly from a lower part 106 of the front wall 100 and extending continuously between the opposite ends of the back beam 104, and an upturned flange 108 integral with the front wall 102. The back wall 100 slopes upwardly and frontwardly from the lower lip 104.

As shown in FIG. 4, the front beam 20 near its left end 110 has a pair of vertical slots, namely an inner slot 112 and an outer slot 114. Also, the front beam 20 near its right end 120 has a pair of similar slots, namely an inner slot and an outer slot. As shown in FIG. 1, the back beam 22 near its left end 130 has a pair of vertical slots, namely an inner slot 132 and an outer slot 134. Also, the back beam 22 near its right end (not shown) has a pair of similar slots, namely an inner slot and an outer slot.

As shown in FIGS. 6, 7, and 8, the front beam 20 is snapped manually, or with the aid of a rubber mallet (not shown) or another suitable tool, onto the front portion 60 of the side beam 24 so that the outer slot 114 receives the tab 76 and so that the lower lip 94 projects backwardly into the front notch 72 so as to secure the front beam 20 to the side beam 24. Being roll-formed from carbon steel, the front beam 20 has sufficient resiliency to enable the lower lip 94 to snap over the front part 74 of the fin 70, into the front notch 72, after the tab 76 has been received by the outer slot 114. Simultaneously, the front beam 20 is snapped similarly onto the front portion 64 of the side beam 26 in a similar manner so as to secure the front beam 20 to the side beam 26.

As shown in FIGS. 6, 7, and 8, the back beam 22 is snapped similarly onto the back portion 62 of the side beam 24 so that the outer slot 134 receives the tab 86 and so that the lower lip 104 projects frontwardly into the back notch 82 so as to secure the back beam 22 to the side beam 24. Being roll-formed from carbon steel, the back beam 22 has sufficient resiliency to enable the lower lip 104 to snap over the front part 84 of the fin 80, into the front notch 82, after the tab 86 has been received by the outer slot 134. Simultaneously, the back beam 22 is snapped onto the back portion 66 of the side beam 26 in a similar manner so as to secure the back beam 22 to the side beam 60.

Sloping over the sloping edges of the fins of the front portions of the side beams 24, 26, the front wall 90 of the front beam can be conveniently labelled with alphanumeric characters, bar codes, or both via adhesive labels (not shown) or otherwise. Sloping over the sloping edges of the fins of the back portions of the side beams 24, 26, the back wall 100 of the back beam 22 can be similarly labelled.

As shown in FIG. 5, which shows elements of the storage rack 10 and elements of an adjacent rack 10' similar to the storage rack 10, the inner slots near the opposite ends of the front beams 24, 24' of the respective racks may be alternatively used to receive the tabs on the front portions of the side beams of the respective racks, whereupon the inner slots near the opposite ends of the back beams must be then used to receive the tabs on the back portions of the side beams of the respective racks. The front and back beams of the respective racks can be then used as wire tracks for purposes discussed in U.S. Pat. Nos. 5,279,430 and No. 5,350,122, the disclosures of which are incorporated herein by reference.

Various modifications of the preferred embodiment described above may be made without departing from the scope and spirit of this invention.

It is claimed:

1. A storage rack having multiple tiers, comprising two front columns and two back columns, and comprising, at each tier, two side beams and a front beam, each side beam connecting an associated one of the front columns and an associated one of the back columns, each side beam having a front portion projecting frontwardly beyond the associated one of the front columns, the front beam connecting the front portions of the side beams, wherein the front portion of each side beam has a fin projecting upwardly from the front portion of said side beam and having a front part, a front notch opening frontwardly and extending backwardly below the front part of the fin, and a tab projecting backwardly from the fin, and wherein the front beam has a front wall, a back wall unitary with the front wall, and a lower lip unitary with the front wall, the lower lip projecting backwardly from a lower part of the front wall, the back wall having two slots, each slot receiving the tab projecting backwardly from the fin of the front portion of a respective one of the side beams and the lower lip projecting backwardly into the front notches of the front portions of the side beams so as to secure the front beam to the side beams.

2. The storage rack of claim 1 wherein the front beam has two opposite ends, the lower lip extending continuously between the opposite ends of the front beam.

3. The storage rack of claim 2 wherein the front part of the fin of each side beam has a front edge sloping upwardly and backwardly above the front notch and wherein the front wall of the front beam slopes upwardly and backwardly from the lower lip.

4. The storage rack of claim 3 wherein the front beam has sufficient resiliency to enable the lower lip of the front beam to snap over the front parts of the fins, into the front notches, after the tabs have been received by the slots.

5. The storage rack of claim 3 wherein the front beam has an outer slot and an inner slot at each of the opposite ends, and wherein the tabs are received alternatively by the inner slots or by the outer slots.

6. A storage rack having multiple tiers, comprising two front columns and two back columns, and comprising, at each tier, two side beams, a front beam, and a back beam, each side beam connecting an associated one of the front columns and an associated one of the back columns, each side beam having a front portion projecting frontwardly beyond the associated one of the front columns, and each side beam having a back portion projecting backwardly beyond the associated one of the back columns, the front beam connecting the front portions of the side beams and the back beam connecting the back portions of the side beams, wherein the front portion of each side beam has a fin projecting upwardly from the front portion of said side beam and having a front part, a front notch opening frontwardly below the front part of the fin of the front portion, and a tab projecting backwardly from the fin of the front portion, wherein the back portion of each side beam has a fin projecting upwardly from the back portion of said side beam, a back notch opening backwardly below a back part of the fin of the back portion, and a tab projecting backwardly from a front part of the fin of the back portion, wherein the front beam has a front wall, a back wall unitary with the front wall, and a lower lip unitary with the front wall, the lower lip of the front beam projecting backwardly from a lower part of the front wall, the back wall having two slots, each slot of the back wall of the front beam receiving the tab projecting backwardly from the front part of the fin of the front portion of a respective one of the side beams and the lower lip of the front beam projecting backwardly into the front notches of the front portions of the side beams so as to secure the front beam to the side beams, and wherein the back beam has a back wall, a front wall unitary with the back wall of the back beam, and a lower lip unitary with the back wall of the back beam, the lower lip of the back beam projecting from a lower part of the back wall of the back beam, the back wall of the back beam having two slots, each slot of the back wall of the back beam receiving the tab projecting frontwardly from the inner part of the fin of the back portion of a respective one of the side beams and the lower lip of the back beam projecting frontwardly into the back notches of the back portions of the side beams so as to secure the back beam to the side beams.

7. The storage rack of claim 6 wherein the front beam has an outer slot and an inner slot at each of the opposite ends of the front beam, wherein the back beam has an outer slot and an inner slot at each of the opposite ends of the back beam, and wherein the tabs are received alternatively by the inner slots or by the outer slots.

* * * * *